«12» United States Patent
Kim et al.

US007825528B2

(10) Patent No.: US 7,825,528 B2
(45) Date of Patent: Nov. 2, 2010

(54) EPOXY RESIN COMPOSITION FOR PACKAGING A SEMICONDUCTOR DEVICE, METHOD OF MAKING THE SAME, AND SEMICONDUCTOR DEVICE USING THE SAME

(75) Inventors: Jo Gyun Kim, Gunpo-si (KR); Kun Bae Noh, Seoul (KR); Yoon Kok Park, Suwon-si (KR)

(73) Assignee: Cheil Industries, Inc., Gyeongsangbuk-do (KR)

( * ) Notice: Subject to any disclaimer, the term of this patent is extended or adjusted under 35 U.S.C. 154(b) by 997 days.

(21) Appl. No.: 11/496,449

(22) Filed: Aug. 1, 2006

(65) Prior Publication Data

US 2007/0031675 A1 Feb. 8, 2007

(30) Foreign Application Priority Data

Aug. 2, 2005 (KR) ............... 10-2005-0070477
Sep. 29, 2005 (KR) ............... 10-2005-0091006

(51) Int. Cl.
*H01L 23/29* (2006.01)
*C08L 63/00* (2006.01)
*C08K 3/36* (2006.01)
*B32B 27/04* (2006.01)
*B32B 27/20* (2006.01)
*B32B 27/26* (2006.01)
*B32B 27/38* (2006.01)

(52) U.S. Cl. .................. 257/789; 257/787; 257/788; 257/793; 257/795; 523/440; 523/443

(58) Field of Classification Search .................. None
See application file for complete search history.

(56) References Cited

U.S. PATENT DOCUMENTS 4,724,172 A * 2/1988 Mosser et al. ............ 427/383.5

6,143,423 A * 11/2000 Shiobara et al. ............. 428/620
2006/0214153 A1* 9/2006 Ikezawa et al. ............... 257/40

FOREIGN PATENT DOCUMENTS

| KR | 10-2005-0070621 A | * | 7/2005 |
| KR | 10-2005-0070622 A | * | 7/2005 |
| KR | 10-0561569 B1 | * | 3/2006 |
| KR | 10-0561575 B1 | * | 3/2006 |
| KR | 10-2006-0074159 A | * | 7/2006 |
| WO | WO 2004090033 A1 | * | 10/2004 |

OTHER PUBLICATIONS

Translation of KR 10-0561575 B1, provided by the KIPO website (2006).*
Translation of KR 10-2006-0074159A, provided by the KIPO website (2006).*
Translation of KR 10-2005-0070621A, provided by the KIPO website (2005).*
Translation of KR 10-2005-0070622A, provided by the KIPO website (2005).*
Derwent abstract of KR 10-0561575 B1 (2006).*
Machine translation of KR 10-0561569 B1, provided by the KIPO website (2006).*
Human translation of KR 10-0561575 B1, provided by the USPTO translations branch (2009).*
Ryu, Je Hong, et al., Latent Catalyst Effects in Halogen-Free Epoxy Molding Compounds for Semiconductor Encapsulation:, Journal of Applied Polymer Science, vol. 96, 2287-2295, (2005).

* cited by examiner

*Primary Examiner*—Michael J Feely
(74) *Attorney, Agent, or Firm*—Lee & Morse P.C.

(57) ABSTRACT

An epoxy resin composition, and a method of making the same, includes an epoxy resin and a curing agent, the epoxy resin composition also includes inorganic fillers, curing accelerators, and modified silicone oils. The epoxy resin is a modified epoxy resin prepared by glycidyl etherification of a mixture of a novolac type phenolic compound having a biphenyl derivative in the molecule and a 4,4'-dihydroxy biphenyl compound, and the curing agent is a mixture of a polyaromatic curing agent and a polyfunctional curing agent.

19 Claims, 1 Drawing Sheet

EPOXY RESIN COMPOSITION FOR PACKAGING A SEMICONDUCTOR DEVICE, METHOD OF MAKING THE SAME, AND SEMICONDUCTOR DEVICE USING THE SAME

BACKGROUND OF THE INVENTION

1. Field of the Invention

The present invention relates to an epoxy resin composition. In particular, the present invention relates to an epoxy resin composition for packaging a semiconductor device, a method of making the same, and a semiconductor device using the same, which exhibits high flame retardance in packages without requiring a halogen-type or phosphorus-type flame retardant, good bending resistance and reflow resistance in packages, and high moldability even in thin packages.

2. Description of the Related Art

Surface-mount ball-grid array-type (BGA-type) packages have recently received a great deal of attention. However, since BGA-type packages have a single-face packaging structure, they tend to bend due to an asymmetrical coefficient of linear thermal expansion. Further, there is a need to prevent bending arising from asymmetrical upper and lower structures in newly introduced packages, such as board-on-chips (BOCs) and multi-chip packages (MCPs). Further, the thickness of packaging materials in new packages, such as BOCs and MCPs, may be decreased to roughly one hundred microns. This small thickness may result in frequent molding defects during packaging, e.g., formation of voids, occurrences of incomplete molding, etc. Thus, there is a need for packaging materials that are suitable to modern package designs.

Further, in view of increasing awareness of the impacts of semiconductor manufacturing on the environment, lead-free soldering processes may be applied to the mounting of semiconductor packages. Lead-free soldering processes suitable for semiconductor packaging may use materials having a higher melting point than that of materials used in conventional lead-containing soldering processes. Accordingly, a considerable increase in reflow temperatures may occur in lead-free soldering processes, which may, in turn, be detrimental to the reliability of the final packages. Thus, there is a need for packaging materials that do not degrade when used in combination with advanced reflow processes, thereby promoting the reliability of the packaged devices.

SUMMARY OF THE INVENTION

The present invention is therefore directed to an epoxy resin composition for packaging a semiconductor device, a method of making the same, and a semiconductor device using the same, which substantially overcome one or more of the problems due to the limitations and disadvantages of the related art.

It is therefore a feature of an embodiment of the present invention to provide an epoxy resin composition that exhibits high flame retardance in packages without requiring a halogen-type or phosphorus-type flame retardant.

It is therefore another feature of an embodiment of the present invention to provide an epoxy resin composition that exhibits good bending resistance and reflow resistance in packages.

It is therefore a further feature of an embodiment of the present invention to provide an epoxy resin composition that exhibits high moldability even in thin packages.

It is therefore yet another feature of an embodiment of the present invention to provide a semiconductor device packaged by using the epoxy resin composition.

At least one of the above and other features and advantages of the present invention may be realized by providing an epoxy resin composition including an epoxy resin and a curing agent, wherein the epoxy resin is a modified epoxy resin prepared by glycidyl etherification of a mixture of a novolac type phenolic compound having a biphenyl derivative in the molecule, represented by Formula 1:

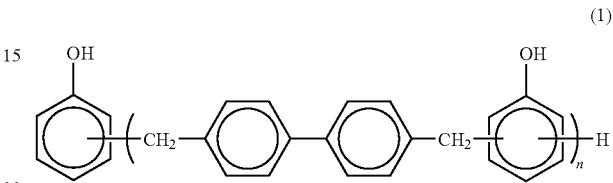

(1)

(wherein n is an average of 1 to 6) and a 4,4'-dihydroxy biphenyl compound, represented by Formula 2:

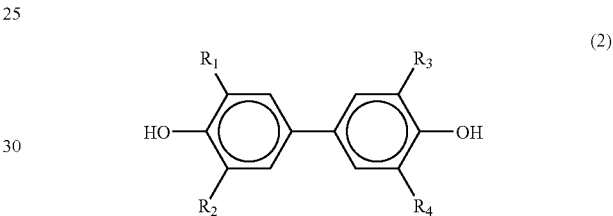

(2)

(wherein $R_1$, $R_2$, $R_3$ and $R_4$ are hydrogen, alkyl, or aryl substituents or derivatives thereof), and the curing agent is a mixture of the novolac type phenolic compound having a biphenyl derivative in the molecule, represented by Formula 1 (wherein n is an average of 1 to 6) and a polyfunctional curing agent, the polyfunctional curing agent including a structure represented by Formula 3:

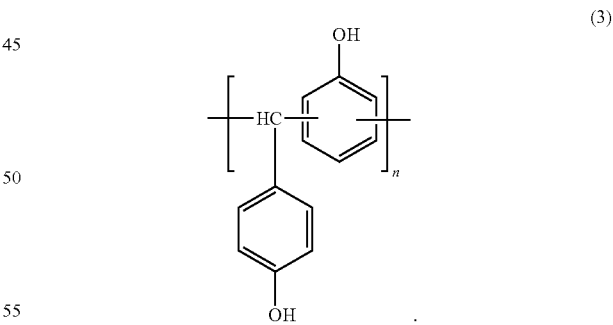

(3)

(wherein n is an average of 1 to 6).

$R_1$, $R_2$, $R_3$ and $R_4$ in the 4,4'-dihydroxy biphenyl compound represented by Formula 2 may each be $CH_3$. The epoxy resin may be present in an amount of about 0.5 to about 15% by weight, based on the total weight of the epoxy resin composition, and the curing agent may be present in an amount of about 2 to about 10.5% by weight, based on the total weight of the epoxy resin composition. The novolac type phenolic compound having a biphenyl derivative in the molecule represented by Formula 1 and the polyfunctional curing agent represented by Formula 3 may be mixed in a weight ratio of from about 20:80 to about 60:40.

The epoxy resin composition may further include an inorganic filler, wherein the inorganic filler is fused silica, synthetic silica or a mixture thereof. The inorganic filler may be present in an amount of about 80 to about 93% by weight, based on the total weight of the epoxy resin composition. The inorganic filler may have a mean particle size of 8.7 μm to 14.9 μm; a particle size distribution in which particles having a particle size of 3 μm or smaller account for 15.4% to 23.4%, particles having a particle size of 24 μm or smaller account for 66.9% to 84.3%, and particles having a particle size of 53 μm or larger account for 0.3% by weight or less on a cumulative weight basis; and an average sphericity of 0.85 or more.

The epoxy resin composition may further include about 0.1% to about 0.3% by weight, based on the total weight of the epoxy resin composition, of a curing accelerator selected from the group consisting essentially of: tertiary amines; imidazoles; organic phosphines; tetraphenylborates; and mixtures thereof. The epoxy resin composition may further include about 0.1% to about 0.3% by weight, based on the total weight of the epoxy resin composition, of a curing accelerator selected from the group consisting essentially of: benzyldimethylamine; triethanolamine; triethylenediamine; dimethylaminoethanol; 2-methylimidazole; 2-phenylimidazole; triphenylphosphine; diphenylphosphine; phenylphosphine; tetraphenylphosphonium tetraphenylborate; triphenylphosphine tetraphenylborate; and mixtures thereof.

The epoxy resin composition may further include about 0.5 to about 1.5% by weight, based on the total weight of the epoxy resin composition, of a modified silicone oil. The modified silicone oil may be a highly heat-resistant modified silicone oil selected from the group consisting essentially of: silicone oils having an epoxy group; silicone oils having an amine group; silicone oils having a carboxyl group; and mixtures thereof.

At least one of the above and other features and advantages of the present invention may also be realized by providing a method of preparing an epoxy resin composition including forming a modified epoxy resin by glycidyl etherification of a mixture of a novolac type phenolic compound having a biphenyl derivative in the molecule, represented by Formula 1:

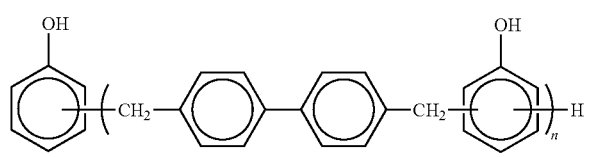

(1)

(wherein n is an average of 1 to 6) and a 4,4'-dihydroxy biphenyl compound, represented by Formula 2:

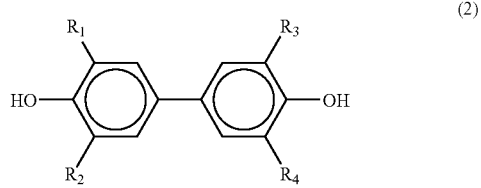

(2)

(wherein $R_1$, $R_2$, $R_3$ and $R_4$ are hydrogen, alkyl, or aryl substituents or derivatives thereof), and the curing agent is a mixture of the novolac type phenolic compound having a biphenyl derivative in the molecule, represented by Formula 1 (wherein n is an average of 1 to 6) and a polyfunctional curing agent, the polyfunctional curing agent including a structure represented by Formula 3:

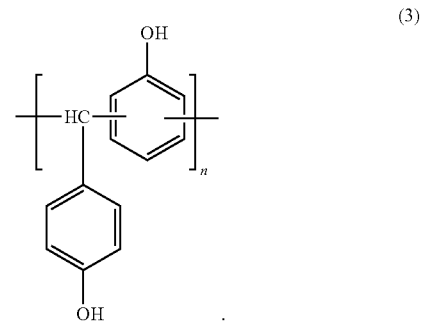

(3)

(wherein n is an average of 1 to 6).

$R_1$, $R_2$, $R_3$ and $R_4$ in the 4,4'-dihydroxy biphenyl compound represented by Formula 2 may each be $CH_3$. The modified epoxy resin may be added in an amount of about 0.5 to about 15% by weight, based on the total weight of the epoxy resin composition, and the curing agent may be added in an amount of about 2 to about 10.5% by weight, based on the total weight of the epoxy resin composition. The novolac type phenolic compound having a biphenyl derivative in the molecule represented by Formula 1 and the polyfunctional curing agent represented by Formula 3 may be mixed in a weight ratio of from about 20:80 to about 60:40.

The method may further include combining the modified epoxy resin and the curing agent with an inorganic filler, wherein the inorganic filler may be fused silica, synthetic silica or a mixture thereof. The inorganic filler may be added in an amount of about 80 to about 93% by weight, based on the total weight of the epoxy resin composition. The inorganic filler may have a mean particle size of 8.7 μm to 14.9 μm; a particle size distribution in which particles having a particle size of 3 μm or smaller account for 15.4% to 23.4%, particles having a particle size of 24 μm or smaller account for 66.9% to 84.3%, and particles having a particle size of 53 μm or larger account for 0.3% by weight or less on a cumulative weight basis; and an average sphericity of 0.85 or more.

The method may further include combining the modified epoxy resin and the curing agent with about 0.1% to about 0.3% by weight, based on the total weight of the epoxy resin composition, of a curing accelerator selected from the group consisting essentially of: tertiary amines; imidazoles; organic phosphines; tetraphenylborates; and mixtures thereof. The method may further include combining the modified epoxy resin and the curing agent with about 0.5 to about 1.5% by weight, based on the total weight of the epoxy resin composition, of a modified silicone oil.

At least one of the above and other features and advantages of the present invention may also be realized by providing a semiconductor device packaged by using the epoxy resin composition.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
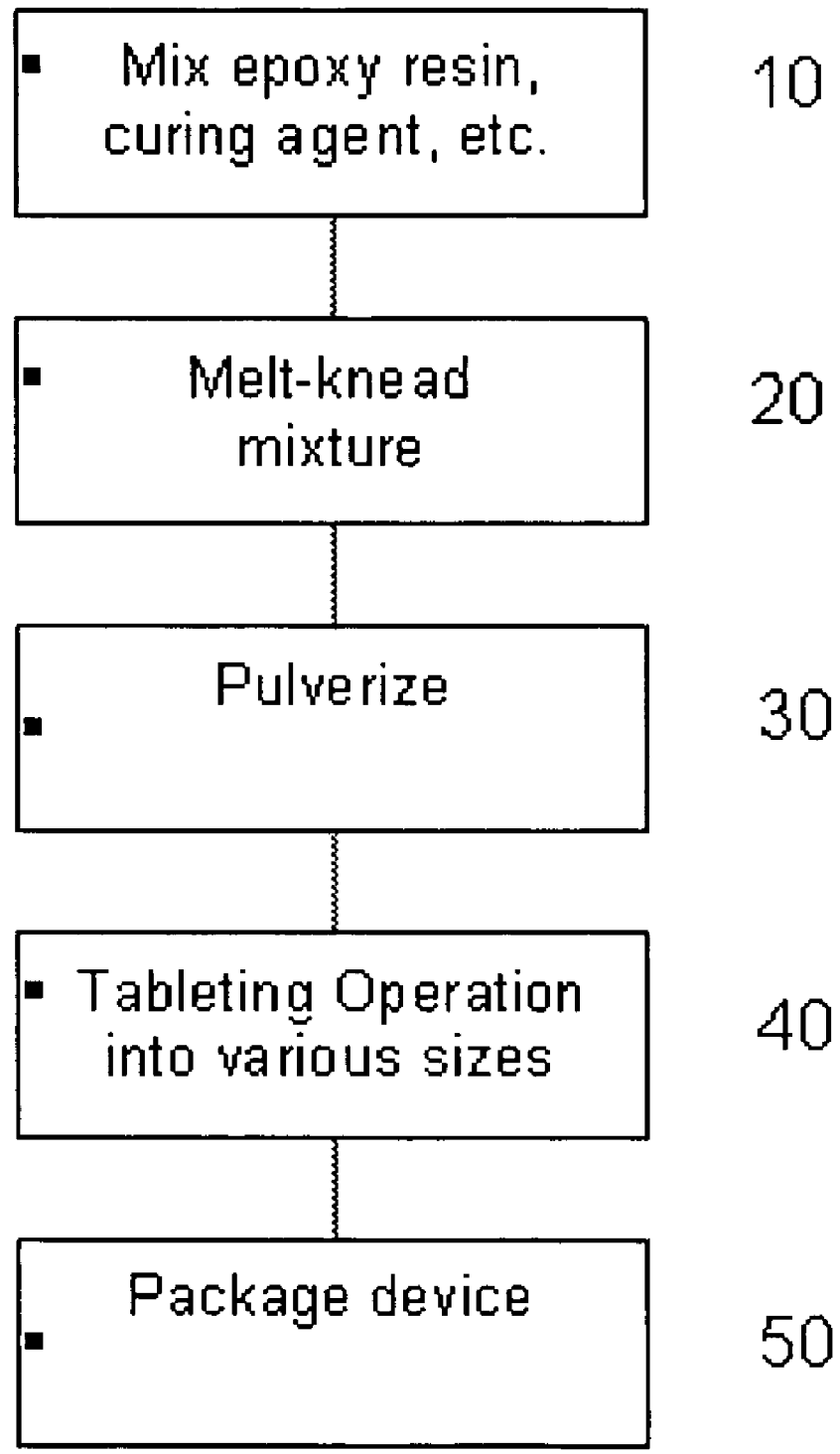
FIG. 1 illustrates a flow chart of a method of making and using an epoxy resin composition according to the present invention.

Korean Patent Application Nos. 10-2005-0070477, filed on Aug. 2, 2005, in the Korean Intellectual Property Office, and entitled: "Epoxy Resin Composition for Packaging Semiconductor Device," and 10-2005-0091006, filed on Sep. 29, 2005, in the Korean Intellectual Property Office, and entitled: "Epoxy Resin Composition for Packaging Semiconductor Device," are incorporated by reference herein in their entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. Like reference numerals refer to like elements throughout.

An epoxy resin composition for packaging a semiconductor device according to the present invention may include an epoxy resin and a curing agent. The epoxy resin composition may further include inorganic fillers, curing accelerators, modified silicone oils and other additives.

In detail, the epoxy resin according to the present invention may be a modified epoxy resin prepared by glycidyl etherification of a mixture of a novolac type phenolic compound having a biphenyl derivative in the molecule, represented by Formula 1, below:

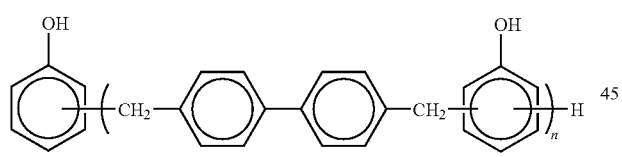

(1)

(wherein n is an average of 1 to 6), and a 4,4'-dihydroxy biphenyl compound, represented by Formula 2, below:

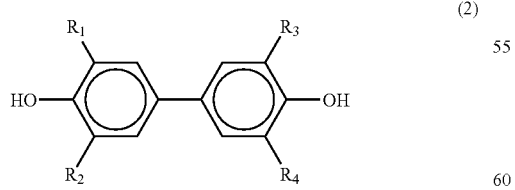

(2)

(wherein $R_1$, $R_2$, $R_3$ and $R_4$ are hydrogen, alkyl, or aryl substituents or derivatives thereof).

The substituents $R_1$, $R_2$, $R_3$ and $R_4$ in the 4,4'-dihydroxy biphenyl compound represented by Formula 2 may each be $CH_3$, as represented by Formula 2', below:

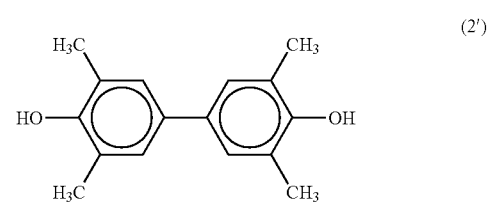

(2')

Since the modified epoxy resin according to the present invention may have a polyaromatic structure wherein a biphenyl moiety is included in a phenol skeleton, the modified epoxy resin may enable the manufacture of semiconductor packages exhibiting superior resistance to moisture absorption and having high toughness, oxidation resistance and crack resistance. In addition, the modified epoxy resin may exhibit a low crosslinking density, enabling the formation of a char layer upon combustion at high temperatures and thereby providing satisfactory flame retardance. The modified epoxy resin may be used in an amount of from about 0.5 to about 15% by weight, based on the total weight of the epoxy resin composition.

The curing agent according to the present invention may be a mixture of a polyaromatic curing agent, which may be the novolac type phenolic compound having a biphenyl derivative in the molecule, represented by Formula 1, below:

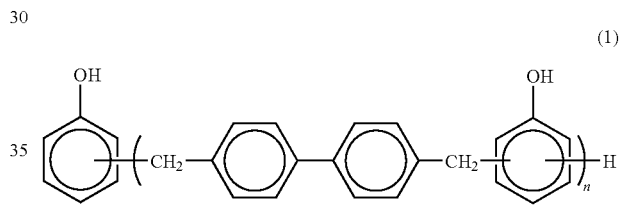

(1)

(wherein n is an average of 1 to 6), and a polyfunctional curing agent, the polyfunctional curing agent including a structure represented by Formula 3, below:

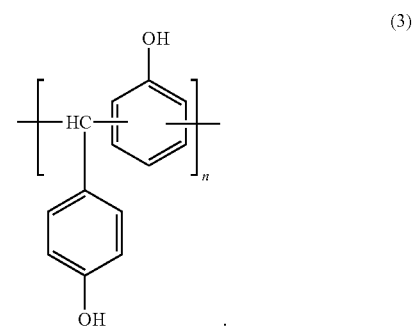

(3)

(wherein n is an average of 1 to 6).

The polyaromatic and polyfunctional curing agents may be mixed in a weight ratio of from about 20:80 to about 60:40. The use of less than about 20% by weight of the polyaromatic curing agent may result in a package that does not exhibit satisfactory flame retardance. Further, the use of more than about 60% by weight of the polyaromatic curing agent may result in an undesirable lowering of the glass transition temperature ($T_g$) of the package, making it difficult to ensure satisfactory bending resistance.

Where the epoxy resin composition according to the present invention includes the polyaromatic curing agent represented by Formula 1, the polyaromatic curing agent may react with the modified epoxy resin in such a way that the epoxy resin composition forms a char layer upon combustion, thereby impairing the transfer of heat and oxygen to surrounding materials and delivering satisfactory flame retardance. The curing agent may be used in an amount of from about 2% to about 10.5% by weight, based on the total weight of the epoxy resin composition.

Where the epoxy resin composition according to the present invention includes an inorganic filler, the inorganic filler may be, e.g., fused silica, synthetic silica or a mixture thereof. In an embodiment of the present invention, the epoxy resin composition includes an inorganic filler having a mean particle size of 8.7 μm to 14.9 μm; a particle size distribution in which particles having a particle size of 3 μm or smaller account for 15.4% to 23.4%, particles having a particle size of 24 μm or smaller account for 66.9% to 84.3%, and particles having a particle size of 53 μm or larger account for 0.3% by weight or less on a cumulative weight basis; and an average sphericity of 0.85 or more The use of an inorganic filler wherein particles having a size of 53 μm or larger are present in an amount exceeding 0.3% by weight, or wherein particles have an average sphericity of less than 0.85, may result in the formation of voids or incomplete filling. In particular, the presence of small apertures during molding, which is a characteristic of thin packages, may not be compatible with such fillers, thus adversely affecting the moldability.

The inorganic filler may account for the remaining weight percent of the composition. In particular, the inorganic filler may be used in an amount of from about 80% to about 93% by weight, based on the total weight of the epoxy resin composition.

The use of less than about 80% by weight of the inorganic filler in the epoxy resin composition may result in a package that does not exhibit satisfactory strength or low-temperature expansion, and which is easily permeated by water, thus negatively affecting the reliability of the packaged device. Further, the use of more than about 93% by weight of the inorganic filler in the epoxy resin composition may impair the flow characteristics of the epoxy resin composition during packaging, leading to poor moldability.

The epoxy resin composition of the present invention may further include a curing accelerator to promote the curing reaction between the modified polyaromatic epoxy resin and the curing agents. The curing accelerator may include: tertiary amines, e.g., benzyldimethylamine, triethanolamine, triethylenediamine, dimethylaminoethanol and tri(dimethylaminomethyl)phenol; imidazoles, e.g., 2-methylimidazole and 2-phenylimidazole; organic phosphines, e.g., triphenylphosphine, diphenylphosphine and phenylphosphine; and tetraphenylborates, e.g., tetraphenylphosphonium tetraphenylborate and triphenylphosphine tetraphenylborate. The curing accelerators may be used alone or in combination. The amount of the curing accelerator used may be between about 0.1% and about 0.3% by weight, based on the total weight of the epoxy resin composition.

The epoxy resin composition of the present invention may further include a modified silicone oil, which may be a highly heat-resistant silicon polymer. The modified silicone oil may include silicone oils having an epoxy group, silicone oils having an amine group, and silicone oils having a carboxyl group. The modified silicone oils may be used alone or in combination. The amount of the modified silicone oil used may be between about 0.5 to about 1.5% by weight, based on the total weight of the epoxy resin composition.

The use of more than about 1.5% by weight of the modified silicone oil may result in surface contamination along with resin bleed-out. Further, the use of less than about 0.5% by weight of the modified silicone oil may result in a package that does not exhibit a satisfactorily low modulus of elasticity.

The epoxy resin composition of the present invention may further include additional additives, such as release agents, e.g., a higher fatty acid, a higher fatty acid metal salt, or an ester-based wax; colorants, e.g., carbon black, or an organic or inorganic dye; coupling agents, e.g., epoxy silane, aminosilane, or alkyl silane; and the like.

FIG. 1 illustrates a flow chart of a method of making and using an epoxy resin composition according to the present invention. Referring to FIG. 1, the epoxy resin composition of the present invention may be prepared in accordance with the following general procedure. In operation 10, the specified amounts of the above components may be uniformly and sufficiently mixed using a mixer, such as a Henschel mixer, available from Reimelt Henschel MischSystem GmbH, Germany, or a Redige mixer, available from Matsubo Corp., Japan. In operation 20, the mixture may be melt-kneaded using a roll mill or kneader and thereafter cooled. In operation 30, the resulting product may then be pulverized to obtain the final product in a powder form. In operation 40, a tableting operation may be used to convert the pulverized product into tablets of suitable size(s). In operation 50, the final product may be used to package a semiconductor device. In particular, low-pressure transfer molding, a widely used process, may be used to package a semiconductor device using the epoxy resin composition of the present invention. Injection molding or casting may also be employed to package a semiconductor device.

The present invention will now be described in more detail with reference to the following examples. However, these examples are not to be construed as limiting the scope of the present invention.

EXAMPLES 1 to 3

For examples 1 to 3, the respective components were weighed in accordance with the compositions indicated in Table 1, and uniformly mixed using a Henschel mixer to obtain first powdery compositions. The first powdery compositions were melt-kneaded at 100° C. using a mixing two-roll mill for 7 minutes, cooled, and pulverized to prepare epoxy resin compositions for packaging semiconductor devices according to the present invention.

The physical properties and reliability of packages formed using the epoxy resin compositions thus prepared were evaluated in accordance with the following methods. For measuring the reliability, the epoxy resin compositions were molded at 175° C. using a molder for 70 seconds, and post-cured at 175° C. for 2 hours to fabricate BOC-type packages for semiconductor devices.

Test results for the physical properties, moldability, bending resistance, and reliability of the BOC type packages are shown in Table 2. The reliability test indicates a degree of crack formation in the packages occurring during a temperature cycle test, and a degree of defects in electrical properties after moisture absorption in a pressure cooker test (PCT).

Evaluation of Physical Properties

1) Spiral Flow:

First, a mold was manufactured in accordance with the corresponding EMMI specification. The flow length of each composition was measured under a molding pressure of 70 kgf/cm² at a molding temperature of 175° C.

2) Glass Transition Temperature ($T_g$):

The glass transition temperature of each composition was measured using a thermomechanical analyzer (TMA).

3) Coefficient of Thermal Expansion ($\alpha1$):

The coefficient of linear thermal expansion of each composition was evaluated in accordance with the procedure of ASTM D696.

4) Electrical Conductivity:

A cured EMC test piece was pulverized in a pulverizer to yield a test sample having a particle size of about #100 to about #400 mesh. Next, 2 g±0.2 mg of the test sample was put into an extraction bottle, and 80 cc of distilled water was added thereto. After the mixture was extracted in an oven at 100° C. for 24 hours, the supernatant was separated. The electrical conductivity of the supernatant was measured.

5) Flame Retardance:

The flame retardance was measured in accordance with the UL 94 V-0 specification.

6) Bending Resistance:

The resin compositions for packaging materials were transfer-molded at 175° C. for 70 seconds, and post-cured at 175° C. for 2 hours to manufacture BOC packages (48 mm×2 mm×1.1 mm). The bending resistance of each BOC package was measured using a non-contact laser measurement system.

7) Evaluation of Crack Resistance (Reliability Test):

To evaluate whether cracks were formed in the BOC-type packages formed using the epoxy resin compositions according to the present invention, cracks were observed using a scanning acoustic tomograph (SAT), which is a nondestructive detector, following 1,000 cycles in a temperature cycle tester after preconditioning. The electrical properties were evaluated after subjecting the samples to 240 hours in a pressure cooker test (PCT).

7a) Preconditioning:

For preconditioning, the packages were dried at 125° C. for 24 hours, subjected to five cycles of a temperature cycle test, allowed to stand at 30° C. and at a relative humidity of 70% for 96 hours, and passed twice through an IR reflow, which was one cycle of 10 seconds. If cracks were formed in this step, the subsequent step, i.e., temperature cycle test, was not conducted.

7b) Temperature Cycle Test:

The semiconductor packages that passed the preconditioning were exposed to temperature cycles of the following: stand at −65° C. for 10 minutes, 25° C. for 5 minutes, and 150° C. for 10 minutes. After the cycle was repeated 100 times, the formation of inner and outer cracks was observed using the nondestructive SAT detector.

7c) Pressure Cooker Test (PCT):

The semiconductor packages that passed the preconditioning were left to stand at 121° C. under a relative humidity of 100% for 240 hours, after which the electrical properties were evaluated.

Comparative Examples 1 and 2

As comparative examples, comparative epoxy resin compositions were prepared in the same manner as described above in connection with Example 1. For the comparative examples, the respective components were weighed as indicated in the "Comp. Example 1" and "Comp. Example 2" columns of Table 1. The physical properties and reliability of the comparative epoxy resin compositions were evaluated, the results of which are shown in Table 2.

TABLE 1

| Components (wt %) | | Example 1 | | Example 2 | | Example 3 | | Comp. Example 1 | | Comp. Example 2 | |
|---|---|---|---|---|---|---|---|---|---|---|---|
| Epoxy resin | Modified polyaromatic epoxy resin[1] | | 2.9 | | 3.7 | | 4.9 | | 3.7 | | — |
| | Biphenyl | | 4.1 | | 1.5 | | 2.1 | | 2.9 | | 6.9 |
| Curing agent | Polyaromatic[2] | | 1.1 | | 1.5 | | 0.7 | | — | | 3.2 |
| | Polyfunctional[3] | | 2.0 | | 1.4 | | 2.4 | | 3.5 | | — |
| Silica (content, %) | Particle size ≧53 μm | 88 | 0.03 | 90 | 0.05 | 88 | 0.10 | 88 | 8.30 | 88 | 0.10 |
| | Sphericity | | 0.85 | | 0.88 | | 0.88 | | 0.85 | | 0.71 |
| Curing accelerator | | | 0.2 | | 0.2 | | 0.2 | | 0.2 | | 0.2 |
| Flame retardant | | | 0.8 | | 0.8 | | 0.8 | | 0.8 | | 0.8 |
| γ-Glycidyloxypropyl trimethoxy silane | | | 0.4 | | 0.4 | | 0.4 | | 0.4 | | 0.4 |
| Carbon black | | | 0.2 | | 0.2 | | 0.2 | | 0.2 | | 0.2 |
| Carnauba wax | | | 0.3 | | 0.3 | | 0.3 | | 0.3 | | 0.3 |
| Total | | | 100.00 | | 100.00 | | 100.00 | | 100.00 | | 100.00 |

Notes:
[1]Modified polyaromatic epoxy resin is CER-3000-L, NIPPON KAYAKU;
[2]Polyaromatic compound is represented by Formula 1;
[3]Polyfunctional compound includes a structure represented by Formula 3.

TABLE 2

| Tests | | Ex. 1 | Ex. 2 | Ex. 3 | Comp. Ex. 1 | Comp. Ex. 2 |
|---|---|---|---|---|---|---|
| Spiral flow (inch) | | 46 | 40 | 43 | 44 | 42 |
| $T_g$ (° C.) | | 148 | 144 | 152 | 150 | 128 |
| Electrical conductivity (μs/cm) | | 11 | 10 | 11 | 12 | 13 |
| Flexural strength (kgf/mm² at 35° C.) | | 15 | 16 | 15 | 16 | 15 |
| Flexural modulus of elasticity (kgf/mm² at 35° C.) | | 2240 | 2200 | 2250 | 2400 | 2350 |
| Flame retardance | UL 94 V-0 | V-0 | V-0 | V-0 | V-1 | V-1 |
| Moldability | Number of voids (visual inspection) | 0 | 0 | 0 | 167 | 8 |
| | Number of semiconductor devices tested | 2,880 | 2,880 | 2,880 | 2,880 | 2,880 |
| Bending resistance | Degree of bending (μm) | 152 | 104 | 170 | 135 | 307 |
| Reliability | Crack resistance (Temperature cycle test) Number of cracks | 0 | 0 | 0 | 0 | 0 |
| | Number of defects after 240 hours in PCT | 0 | 0 | 0 | 0 | 0 |
| | Number of semiconductor devices tested | 360 | 360 | 360 | 360 | 360 |

As can be seen from the data shown in Table 2, the physical properties, e.g., flame retardance, bending resistance, reliability, moldability, etc., of the packages formed according to the present invention are suitable for packaging semiconductor devices, and, overall, are more suitable for this purpose than the comparative resin compositions. Thus, epoxy resin compositions according to the present invention may be used for semiconductor packages wherein good flame retardance, good bending resistance, good tolerance of reflow processes, and superior moldability are desired.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An epoxy resin composition comprising an epoxy resin, a curing agent, and an inorganic filler, wherein:
   the epoxy resin is a modified epoxy resin prepared by glycidyl etherification of a mixture of:
   a novolac type phenolic compound having a biphenyl derivative in the molecule, represented by Formula 1:

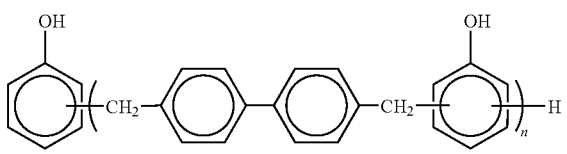

(1)

(wherein n is an average of 1 to 6); and
   a 4,4'-dihydroxy biphenyl compound, represented by Formula 2:

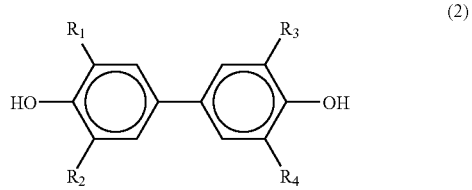

(2)

(wherein $R_1$, $R_2$, $R_3$ and $R_4$ are hydrogen, alkyl, or aryl substituents or derivatives thereof),
   the curing agent is a mixture of:
   the novolac type phenolic compound having a biphenyl derivative in the molecule, represented by Formula 1 (wherein n is an average of 1 to 6); and
   a polyfunctional curing agent, the polyfunctional curing agent including a structure represented by Formula 3:

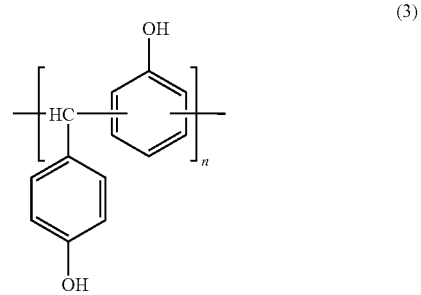

(3)

(wherein n is an average of 1 to 6), and
   the inorganic filler has:
      a particle size distribution in which particles having a particle size of 53 μm or larger account for 0.3% by weight or less on a cumulative weight basis,
      an average sphericity of 0.85 or more,
      a mean particle size of 8.7 μm to 14.9 μm, and
      a particle size distribution in which particles having a particle size of 3 μm or smaller account for 15.4% to 23.4% and particles having a particle size of 24 μm or smaller account for 66.9% to 84.3%.

2. The epoxy resin composition as claimed in claim 1, wherein $R_1$, $R_2$, $R_3$ and $R_4$ in the 4,4'-dihydroxy biphenyl compound represented by Formula 2 are each $CH_3$.

3. The epoxy resin composition as claimed in claim 1, wherein:
   the epoxy resin is present in an amount of about 0.5 to about 15% by weight, based on the total weight of the epoxy resin composition,
   the curing agent is present in an amount of about 2 to about 10.5% by weight, based on the total weight of the epoxy resin composition, and
   the inorganic filler is present in an amount of about 80 to about 93% by weight, based on the total weight of the epoxy resin composition.

4. The epoxy resin composition as claimed in claim 1, wherein the novolac type phenolic compound having a biphenyl derivative in the molecule represented by Formula 1 and the polyfunctional curing agent including a structure represented by Formula 3 are mixed in a weight ratio of from about 20:80 to about 60:40.

5. The epoxy resin composition as claimed in claim 1, wherein the inorganic filler is fused silica, synthetic silica or a mixture thereof.

6. The epoxy resin composition as claimed in claim 1, further comprising about 0.1% to about 0.3% by weight, based on the total weight of the epoxy resin composition, of a curing accelerator selected from the group consisting essentially of: tertiary amines; imidazoles; organic phosphines; tetraphenylborates; and mixtures thereof.

7. The epoxy resin composition as claimed in claim 1, further comprising about 0.1% to about 0.3% by weight, based on the total weight of the epoxy resin composition, of a curing accelerator selected from the group consisting essentially of: benzyldimethylamine; triethanolamine; triethylenediamine; dimethylaminoethanol; 2-methylimidazole; 2-phenylimidazole; triphenylphosphine; diphenylphosphine; phenylphosphine; tetraphenylphosphonium tetraphenylborate; triphenylphosphine tetraphenylborate; and mixtures thereof.

8. The epoxy resin composition as claimed in claim 1, further comprising about 0.5 to about 1.5% by weight, based on the total weight of the epoxy resin composition, of a modified silicone oil.

9. The epoxy resin composition as claimed in claim 8, wherein the modified silicone oil is a highly heat-resistant modified silicone oil selected from the group consisting essentially of: silicone oils having an epoxy group; silicone oils having an amine group; silicone oils having a carboxyl group; and mixtures thereof.

10. A packaged semiconductor device comprising the epoxy resin composition according to claim 1 as a packaging material.

11. An epoxy resin composition consisting essentially of an epoxy resin, a curing agent, and an inorganic filler, wherein:
   the epoxy resin is a modified epoxy resin prepared by glycidyl etherification of a mixture of:
      a novolac type phenolic compound having a biphenyl derivative in the molecule, represented by Formula 1:

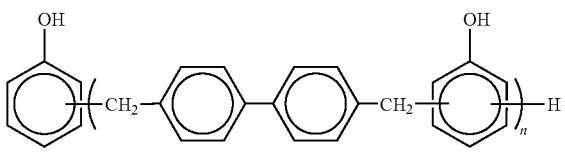

(wherein n is an average of 1 to 6); and
a 4,4'-dihydroxy biphenyl compound, represented by Formula 2:

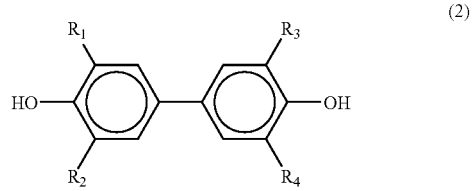

(wherein $R_1$, $R_2$, $R_3$ and $R_4$ are hydrogen, alkyl, or aryl substituents or derivatives thereof),
the curing agent is a mixture of:
   the novolac type phenolic compound having a biphenyl derivative in the molecule, represented by Formula 1 (wherein n is an average of 1 to 6); and
   a polyfunctional curing agent, the polyfunctional curing agent including a structure represented by Formula 3:

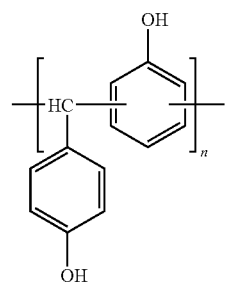

(wherein n is an average of 1 to 6), and
the inorganic filler has:
   a particle size distribution in which particles having a particle size of 53 μm or larger account for 0.3% by weight or less on a cumulative weight basis,
   an average sphericity of 0.85 or more
   a mean particle size of 8.7 μm to 14.9 μm, and
   a particle size distribution in which particles having a particle size of 3 μm or smaller account for 15.4% to 23.4% and particles having a particle size of 24 μm or smaller account for 66.9% to 84.3%.

12. A method of preparing an epoxy resin composition, comprising:
   forming a modified epoxy resin by glycidyl etherification of a mixture of:
      a novolac type phenolic compound having a biphenyl derivative in the molecule, represented by Formula 1:

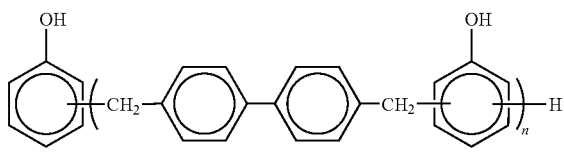

(1)

(wherein n is an average of 1 to 6); and
a 4,4'-dihydroxy biphenyl compound, represented by Formula 2:

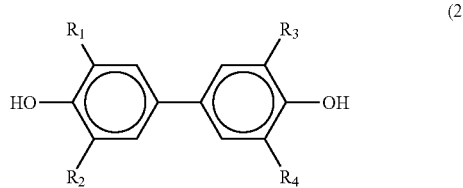

(2)

(wherein $R_1$, $R_2$, $R_3$ and $R_4$ are hydrogen, alkyl, or aryl substituents or derivatives thereof); and
combining the modified epoxy resin with a curing agent and an inorganic filler, wherein the curing agent is a mixture of:
the novolac type phenolic compound having a biphenyl derivative in the molecule, represented by Formula 1 (wherein n is an average of 1 to 6); and
a polyfunctional curing agent, the polyfunctional curing agent including a structure represented by Formula 3:

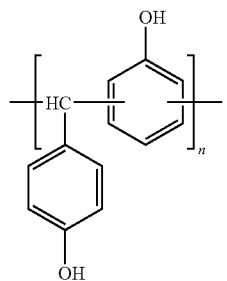

(3)

(wherein n is an average of 1 to 6), and
the inorganic filler has
a particle size distribution in which particles having a particle size of 53 μm or larger account for 0.3% by weight or less on a cumulative weight basis,
an average sphericity of 0.85 or more;
a mean particle size of 8.7 μm to 14.9 μm, and
a particle size distribution in which particles having a particle size of 3 μm or smaller account for 15.4% to 23.4% and particles having a particle size of 24 μm or smaller account for 66.9% to 84.3%.

13. The method as claimed in claim 12, wherein $R_1$, $R_2$, $R_3$ and $R_4$ in the 4,4'-dihydroxy biphenyl compound represented by Formula 2 are each $CH_3$.

14. The method as claimed in claim 12, wherein the modified epoxy resin is added in an amount of about 0.5 to about 15% by weight, based on the total weight of the epoxy resin composition,
the curing agent is added in an amount of about 2 to about 10.5% by weight, based on the total weight of the epoxy resin composition, and
the inorganic filler is added in an amount of about 80 to about 93% by weight, based on the total weight of the epoxy resin composition.

15. The method as claimed in claim 12, wherein the novolac type phenolic compound having a biphenyl derivative in the molecule represented by Formula 1 and the polyfunctional curing agent including a structure represented by Formula 3 are mixed in a weight ratio of from about 20:80 to about 60:40.

16. The method as claimed in claim 12, wherein the inorganic filler is fused silica, synthetic silica or a mixture thereof.

17. The method as claimed in claim 12, further comprising combining the modified epoxy resin, the curing agent, and the inorganic filler with about 0.1% to about 0.3% by weight, based on the total weight of the epoxy resin composition, of a curing accelerator selected from the group consisting essentially of: tertiary amines; imidazoles; organic phosphines; tetraphenylborates; and mixtures thereof.

18. The method as claimed in claim 12, further comprising combining the modified epoxy resin, the curing agent, and the inorganic filler with about 0.5 to about 1.5% by weight, based on the total weight of the epoxy resin composition, of a modified silicone oil.

19. A method of preparing an epoxy resin composition, the method consisting essentially of:
forming a modified epoxy resin by glycidyl etherification of a mixture of:
a novolac type phenolic compound having a biphenyl derivative in the molecule, represented by Formula 1:

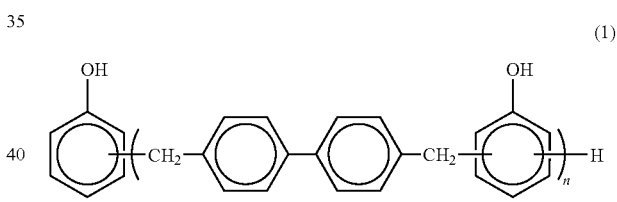

(1)

(wherein n is an average of 1 to 6); and
a 4,4'-dihydroxy biphenyl compound, represented by Formula 2:

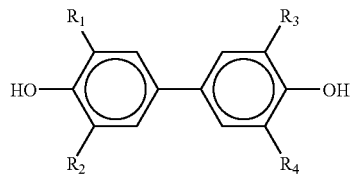

(2)

(wherein $R_1$, $R_2$, $R_3$ and $R_4$ are hydrogen, alkyl, or aryl substituents or derivatives thereof), and
combining the modified epoxy resin with a curing agent and an inorganic filler, wherein the curing agent is a mixture of:
the novolac type phenolic compound having a biphenyl derivative in the molecule, represented by Formula 1 (wherein n is an average of 1 to 6); and
a polyfunctional curing agent, the polyfunctional curing agent including a structure represented by Formula 3:

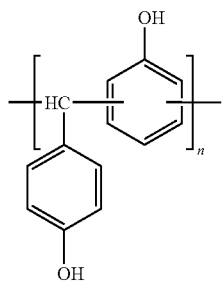
(3)

(wherein n is an average of 1 to 6), and the inorganic filler has:
a particle size distribution in which particles having a particle size of 53 μm or larger account for 0.3% by weight or less on a cumulative weight basis,
an average sphericity of 0.85 or more,
a mean particle size of 8.7 μm to 14.9 μm, and a
particle size distribution in which particles having a particle size of 3 μm or smaller account for 15.4% to 23.4% and particles having a particle size of 24 μm or smaller account for 66.9% to 84.3%.

* * * * *